(12) United States Patent
Javoy et al.

(10) Patent No.: US 12,486,782 B2
(45) Date of Patent: Dec. 2, 2025

(54) DEVICE FOR CONTROLLING AN AIRFLOW GUIDING SYSTEM, IN PARTICULAR IN AN AIRCRAFT TURBINE ENGINE

(71) Applicant: SAFRAN HELICOPTER ENGINES, Bordes (FR)

(72) Inventors: Thibaut Maxime Javoy, Moissy-Cramayel (FR); Christophe Boris Baucheff, Moissy-cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 18/716,824

(22) PCT Filed: Dec. 2, 2022

(86) PCT No.: PCT/FR2022/052231
§ 371 (c)(1),
(2) Date: Jun. 5, 2024

(87) PCT Pub. No.: WO2023/105143
PCT Pub. Date: Jun. 15, 2023

(65) Prior Publication Data
US 2025/0027426 A1    Jan. 23, 2025

(30) Foreign Application Priority Data
Dec. 7, 2021 (FR) ..................................... 2113090

(51) Int. Cl.
*F01D 17/16* (2006.01)
*F01D 25/24* (2006.01)

(52) U.S. Cl.
CPC ........... *F01D 17/162* (2013.01); *F01D 25/24* (2013.01); *F05D 2220/329* (2013.01)

(58) Field of Classification Search
CPC ........ F01D 17/162; F01D 25/24; F01D 21/00; F04D 29/563; F04D 29/46;
(Continued)

(56) References Cited

U.S. PATENT DOCUMENTS 3,334,521 A * 8/1967 Kast ...................... F04D 29/563
 74/110
3,779,665 A * 12/1973 Tatem, Jr. ............... F01D 21/02
 415/149.4

(Continued)

FOREIGN PATENT DOCUMENTS

EP    2881595 A1    6/2015
EP    3502484 A1 *  6/2019
(Continued)

OTHER PUBLICATIONS

International Patent Application No. PCT/FR2022/052231, International Search Report dated Feb. 15, 2023, 15 pages (2 pages of English translation and 13 pages of original document).

*Primary Examiner* — Courtney D Heinle
*Assistant Examiner* — Ryan C Clark
(74) *Attorney, Agent, or Firm* — Kilpatrick Townsend & Stockton LLP (57) ABSTRACT

A device for controlling an airflow guiding system comprising:
 at least one vane movable in rotation about an axis of rotation between a first angle and a second angle,
 an actuator comprising a body inside which a piston is mounted in translation secured to an actuation rod, and
 a control rod comprising a downstream end connected to the axis of the vane, the actuator being configured to drive the control rod in movement between a first end position and a second end position of a nominal operating range and, in the event of breakdown of said device, to perform an over-stroke of the actuation rod into a safety position.

(Continued)

The device comprises a drive mechanism linking an upstream end of the actuation rod to an upstream end of the control rod, opposite to the downstream end.

11 Claims, 4 Drawing Sheets

(58) Field of Classification Search
CPC ........... F05D 2220/329; F05D 2260/50; F05D 2260/56; F05D 2260/57; F05D 2270/09; F05D 2270/64

See application file for complete search history.

(56) References Cited

U.S. PATENT DOCUMENTS

| | | | |
|---|---|---|---|
| 2009/0238681 A1* | 9/2009 | Bouru | F01D 17/162 415/150 |
| 2019/0112941 A1* | 4/2019 | Karapurath | F01D 17/162 |
| 2020/0116042 A1* | 4/2020 | Koletzki | F01D 17/162 |

FOREIGN PATENT DOCUMENTS

| | | | |
|---|---|---|---|
| FR | 3051830 A1 * | 12/2017 | F01D 17/10 |
| WO | WO-2022101260 A1 * | 5/2022 | F01D 17/162 |

\* cited by examiner

DEVICE FOR CONTROLLING AN AIRFLOW GUIDING SYSTEM, IN PARTICULAR IN AN AIRCRAFT TURBINE ENGINE

TECHNICAL FIELD OF THE INVENTION

The present invention relates to the field of aircraft, and in particular aircraft turbine engines.

More particularly, the invention relates to the control of the position of airflow guide elements.

PRIOR ART

In general, a turbine engine comprises a compressor, a combustion chamber located at the outlet of said compressor, a high-pressure turbine intended to drive the compressor in rotation and a low-pressure turbine intended to drive the blades of the aircraft in rotation.

The turbine engine further comprises an airflow guiding system, so-called "inlet guide vanes", abbreviated as "IGV" comprising a plurality of fins or variable-pitch inlet guide vanes, positioned upstream of the compressor and allowing improving the efficiency of the compressor, and thus the thermodynamic cycle of the engine at cruising speed. Such a system contributes to reducing the fuel consumption of the aircraft.

By "variable pitch", it should be understood the synchronization of the angular position of all of the vanes of the same stage through a control ring or crown secured to all vanes. Each vane is linked to the control ring via a control connecting rod.

It is known to control the position of the vanes by a cylinder system fastened on a casing and comprising a piston movable in a cylinder chamber between two end positions of a nominal operating range of the engine, the piston being linked to the control crown via a control rod. During the movement of the piston between the first end position and the second end position, the vanes are continuously movable between a first angle and a second angle.

In general, the control of the movement of the piston is carried out by a fluid, for example oil in the case of a hydraulic control, distributor.

In the event of breakdown of an element of the vane control kinematics, the position of the piston and thus the pitch angle of the vanes could no longer be known.

It is proposed in the patent application FR2011526 of Nov. 10, 2020 to modify the control kinematics of the vanes in order to reach a safety position located beyond an end position of the nominal operating range and to orient the vane at a safety pitch angle located in the nominal operating range.

Nonetheless, in case of maintenance of the control system of the vanes, it would be necessary to send the entire engine to maintenance, which would considerably increase the hourly flight cost of the engine.

There is a need to know the position of the piston and thus of the pitch angle of the vanes, at any time, and in a reliable manner, without affecting the maintenance cost of the engine.

DISCLOSURE OF THE INVENTION

Hence, the present invention aims to overcome the drawbacks of the control devices of the aforementioned airflow guiding systems.

An objective of the invention is to improve safety in the event of breakdown of an element of the control kinematics of the vanes and to reduce the maintenance costs in the event of failure of the control device.

An object of the invention is a device for controlling an airflow guiding system comprising:
- at least one vane movable in rotation about an axis of the vane between a first angle and a second angle,
- an actuator comprising a body inside which a piston is mounted movable in translation secured to an actuating rod, and
- a control rod comprising a downstream end connected to the axis of the vane.

The actuator is configured to drive the piston in movement between a first end position and a second end position of a nominal operating range in which the vane is movable between a first angle and a second angle.

The actuator is also configured to drive the downstream end of the control rod in movement between a first end position and a second end position of the nominal operating range.

The control device comprises a drive mechanism linking an upstream end of the actuation rod to an upstream end of the control rod, opposite to the downstream end.

The drive mechanism is configured, in the event of breakdown of the control device, to bring the downstream end of the control rod into a safety position located between the first end position and a second end position of the nominal operating range and in which the vane is oriented at a safe pitch angle comprised between the first angle and the second angle.

In other words, in the event of breakdown of the control device, the actuator is configured to perform an over-stroke of the piston into a safety position located beyond said second end position of the piston in which the vane is oriented at a safe pitch angle comprised between the first angle and the second angle.

The over-stroke of the piston ensures movement of the downstream end of the control rod into a safety position.

Thus, the drive mechanism is integrated directly between the connection of the control rod and of the actuation rod, which allows improving accessibility thereof in case of maintenance.

Advantageously, the drive mechanism comprises a first connecting member comprising a first end secured to the upstream end of the actuation rod and a second end connected to the control rod via a second connecting member.

For example, the second connecting member comprises a first end hinged relative to the second upstream free end of the control rod, and a second end hinged relative to the second end of the first connecting member.

The drive mechanism further comprises a guide casing fastened on the body of the cylinder and comprising at least one guide rail cooperating with at least one guide pin carried by the second connecting member.

Alternatively, it is possible to provide for two guide rails cooperating with one or two guide pin(s) carried by the second connecting member.

Advantageously, the guide rail comprises a rectilinear main portion, substantially parallel to the axis of the turbine engine and a curve-shaped end portion, said guide pin being located in a stowed position inside said end portion in the safety position of the control rod.

Thus, during the normal operation of the compressor, the rod of the cylinder, and thus the control rod, is movable in translation in the chamber of the cylinder between the two end positions of the nominal operating range of the turbine engine.

According to one embodiment, the guide casing comprises two opposite guide rails each cooperating with a bearing carried by the second connecting member.

The use of bearings allows improving reliability, and in particular limiting wear during movement of said second connecting member.

According to one embodiment, the second end of the control rod hinged relative to the first end of the second connecting member is located upstream of the end of the actuation rod secured to the first connecting member.

In other words, fastening of the first connecting member to the actuation rod is located downstream of the upstream end of the control rod.

According to one embodiment, the second upstream end of the control rod hinged relative to the first end of the second connecting member is located downstream of the upstream end of the actuation rod secured to the first connecting member.

In other words, fastening of the first connecting member to the actuation rod is located upstream of the upstream end of the control rod.

For example, the actuation rod is tubular and is axially crossed by the control rod, the latter being configured to be able to move inside the actuation rod.

According to another aspect, the invention relates to an aircraft turbine engine comprising, from upstream to downstream in the flow direction of the air flow, an inlet sleeve receiving air, a centrifugal compressor, a annular combustion chamber, located downstream of the compressor, a high-pressure power turbine intended to drive the compressor in rotation, an output turbine intended to drive an output shaft in rotation, an airflow guiding system positioned upstream of the compressor and a device for controlling said airflow guiding system as described before.

According to another aspect, the invention relates to a single-engine helicopter comprising a turbine engine as defined before.

BRIEF DESCRIPTION OF THE DRAWINGS

Other aims, features and advantages of the invention will appear upon reading the following description, given only as a non-limiting example, and made with reference to the appended drawings wherein.

Other aims, features and advantages of the invention will appear upon reading the following description, given only as a non-limiting example, and made with reference to the appended drawings wherein.

DETAILED DISCLOSURE OF AT LEAST ONE EMBODIMENT

In the following description, the terms "upstream" and "downstream" are defined with respect to the direction of air circulation in the turbine engine.

Figure 1:
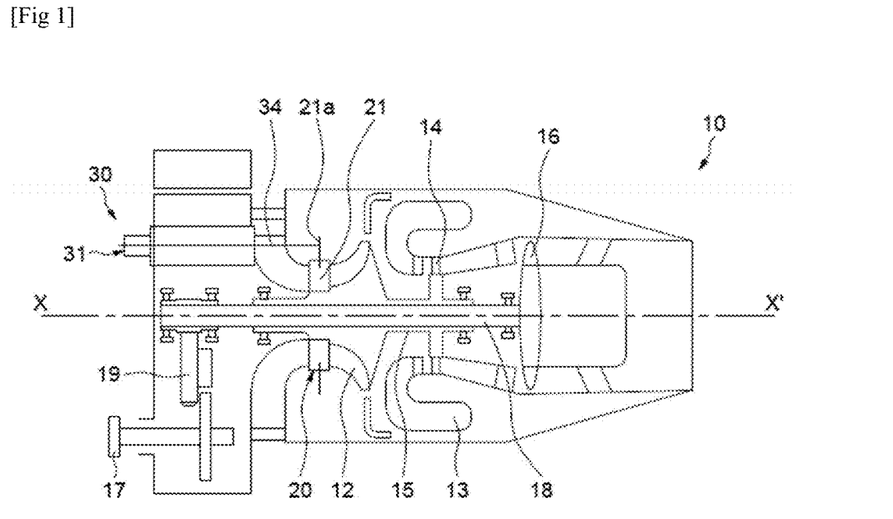
FIG. 1 illustrates in a very schematic way a sectional view of an aircraft turbine engine comprising a device for controlling an airflow guiding system according to the invention.

In FIG. 1 an axial section of a turbine engine 10, with a central axis X-X' which corresponds to the axis of a power shaft (or low-pressure shaft) of the turbine engine, is shown in a very schematic way. As a non-limiting example, the turbine engine may equip single-engine helicopters.

The turbine engine 10 comprises, from upstream to downstream in the flow direction of the airflow, an inlet sleeve 11 receiving air, a centrifugal compressor 12, for example with one or two stage(s), configured to suck in the airflow F. The turbine engine 10 further comprises an annular combustion chamber 13, for example one with reverse flow, located downstream of the compressor 12, a high-pressure power turbine 14 intended to drive the compressor 12 in rotation by a high-pressure shaft 15 and an output turbine 16, for example, one with one single stage, intended to drive an output shaft 17 in rotation via a low-pressure shaft 18, coaxial with the high-pressure shaft 15, and a reduction system 19.

The output shaft 17 is linked to the blades of the aircraft.

The turbine engine 10 further comprises an airflow guiding system 20, called "inlet guide vanes", abbreviated as "IGV", comprising a plurality of variable-pitch fins or guide vanes 21, positioned upstream of the compressor 12.

In a known manner, for example using a synchronization ring linked to levers for controlling the pitch of all vanes 21, the plurality of variable-pitch vanes 21 comprises a main vane controlled in rotation about its axis 21a, and a plurality of secondary vanes whose movement is synchronized with the movement of the main vane.

The blading consisting of the vanes 21 is so-called a "stator" blading, i.e. each vane is movable in rotation about its own axis of rotation.

The axis of rotation 21a of each vane 21 is herein perpendicular with respect to the central axis X-X' of the turbine engine 10.

The turbine engine 10 further comprises a device 30 for controlling the airflow guiding system 20.

The control device 30 of the airflow system 20 comprises an actuator 31 and a control rod 34 connected by its first end 34a to a control lever 35 of a main vane of the plurality of variable pitch vanes 21.

By "variable-pitch" vanes, it should be understood the synchronization of the position of all of the secondary vanes with respect to the main vane.

The control rod 34 is driven in translation by said actuator 31 via a drive mechanism 40.

Without limitation, the actuator 31 may be a cylinder comprising a body 32 fastened on a casing (not referenced) and delimiting a cylindrical chamber 32a inside which a piston 32a is mounted movable in translation secured to a cylinder tubular rod 33 or actuation rod.

The cylinder tubular rod 33 includes an upstream end 33a connected to a second upstream end 34b of the control rod 34, opposite to the first downstream end 34a connected to the vane 21, via a drive mechanism 40.

The control rod 34 is mounted movable in translation in the cylinder tubular rod 33.

The control rod 34 is linked to the axis of the main vane 21 by the control lever 35 hinged relative to the first free end 34a of the control rod 34 opposite to the end 34b linked to the actuator 31. The control lever 35 will not be further described in the remainder of the description.

The body 32 of the cylinder may include two orifices (not shown) opening into the chamber for inlet and outlet of a fluid, intended to make the piston slide inside said cylinder body according to an axis of movement substantially parallel to the central axis X-X' of the turbine engine 10.

For example, the chamber of the cylinder is supplied with fluid, for example oil, by an external energy source conveying the fluid into the chamber of the cylinder via the first orifice. Under the effect of the pressure exerted by the fluid on the rear face of the piston, the latter moves axially along the axis of movement X-X', together with the control rod 34.

The external energy source may be a hydraulic control system comprising a distributor or servovalve configured to distribute the fluid in the chamber of the cylinder. According to the servovalve, it is possible to know the stroke of the piston.

The piston of the cylinder 32a, and thus the control rod 34, is movable in translation in the chamber of the cylinder between two end positions P1', P2'; P1, P2 of a nominal operating range of the turbine engine. During the movement of the cylinder rod 33 between the first end position P1' and the second end position P2', the main vane 21 is continuously movable between a first angle and a second angle defined respectively between the main vane 21 and the horizontal axis parallel to the axis of movement X-X'.

The control device 30 is configured to guide the piston 33, and thus the control rod 34 towards a safety position PS', PS in which the stroke of the piston is known, and thus the opening angle of the vanes 21.

The safety position PS', PS corresponds to an opening position of the vanes in which the turbine engine can operate in a safe manner. The main vane 21a is moved towards a safe angle comprised between the and second nominal operating angles.

The safety position P'S of the cylinder rod 33 is away from one of the positions P1', P2' of the nominal operating range.

The cylinder rod 33 is configured to perform an over-stroke beyond one of its end positions P2'.

Figure 2:
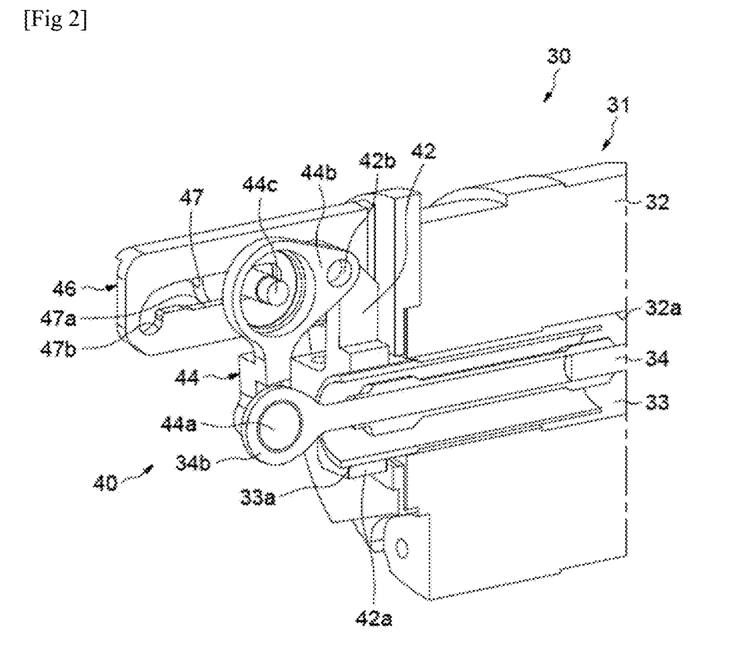
FIG. 2 shows the control device of FIG. 1.

As illustrated in FIG. 2, the drive mechanism 40 comprises a first connecting member 42 comprising a first end 42a secured to the upstream end 33a of the cylinder tubular rod 33 and a second end 42b connected to the control rod 34 via a second connecting member 44.

The second connecting member 44 or connecting rod comprises a first end 44a hinged relative to the second free end 34b of the control rod 34, and a second end 44b hinged relative to the second end 42b of the first connecting member 42.

The first and second connecting members 42, 44 are two distinct parts connected to one another by a pivot connection.

As illustrated in FIG. 2, the second end 34b of the control rod 34 hinged relative to the first end 44a of the second connecting member 44 is located upstream of the end 33a of the cylinder tubular rod 33 secured to the first connecting member 42. In other words, fastening of the first connecting member 42 to the cylinder tubular rod 33 is located downstream of the upstream end 34b of the control rod 34.

As illustrated in FIG. 2, the drive mechanism 40 further comprises a guide casing 46 fastened on the body 32 of the cylinder and comprising a guide rail 47 cooperating with a guide pin 44c carried by the second guide member 44. Alternatively, it is possible to provide for two guide rails cooperating with one or two guide rail(s) carried by the second connecting member 44.

The guide rail 47 comprises a rectilinear main portion 47a, substantially parallel to the axis X-X' of the turbine engine and an end portion 47b at one end of said rail.

The end portion 47b herein has a curved shape.

Thus, during the normal operation of the compressor, the cylinder rod 33, and thus the control rod 34, is movable in translation in the chamber of the cylinder between the two end positions P1', P2'; P1, P2 of the nominal operating range of the turbine engine.

The end position P1', P2' of the cylinder rod 33 is defined by the cylinder. Indeed, in a known manner, any cylinder has inner stops which define the stroke of the piston in the body of the cylinder. Thus, the end portion 47b does not serve as a stop before a stop of the cylinder, with the risk of damaging an element of the drive mechanism 40.

The drive mechanism 40 is configured to bring the control rod 34 into a safety position PS in the event of breakdown of the control device 30. The safety position PS of the control rod 34 is located between the two end positions P1, P2 of the control rod 34 in normal operation. The guide pin 44c is located in a stowed position inside said end portion 47b in the safety position PS of the control rod 34.

The drive mechanism 40 is integrated directly between the connection of the control rod and of the rod of the cylinder, which allows improving accessibility thereof in case of maintenance.

The control rod 34 is configured to move in translation according to the axis of movement X-X' and according to an axis perpendicular to said axis of movement X-X' during movement of the cylinder rod 33. Thus, the control rod 34 has two degrees of freedom.

Figure 3A:
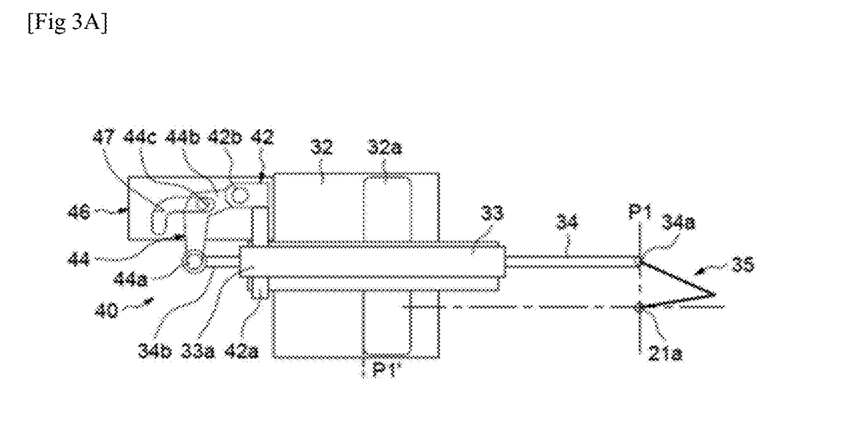
FIG. 3C schematically show three positions of the control device and of the main vane of the flow guiding system of FIG. 2.
Figure 3B:
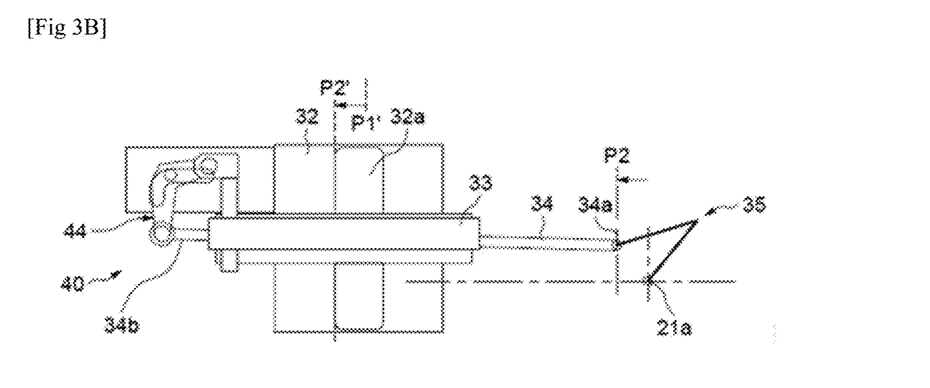
Figure 3C:
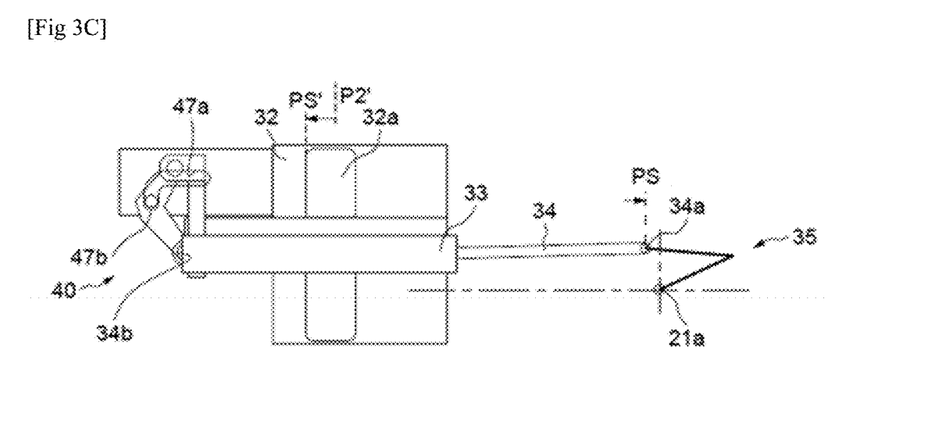

The movement of the control rod 34 is illustrated in FIGS. 3A, 3B and 3C.

FIG. 3A shows the first end position P1 of the free end of the control rod 34 when the cylinder rod 33 is in the first end position P1' of the nominal operating range of the turbine engine 10. In the first end position P1 of the control rod 34, the main vane 21 is open by a first angle (not shown), for example comprised between 45° and 75°, for example larger than or equal to 60°.

FIG. 3B shows the second end position P2 of the free end of the control rod 34 when the cylinder rod 33 is in the second end position P2' of the nominal operating range of the turbine engine 10.

During movement of the cylinder rod 33 from the first end position P1' towards the second end position P2' of the nominal operating range, the drive mechanism 40 is guided in translation in the guide rail 47, in particular over its main portion 47a.

During movement of the control rod 34 from the first end position P1 towards the second end position P2, the main vane 21 is progressively movable from the first angle towards a second angle (not shown) for example equal to 0°. The flow is maximum in this second end position P2.

FIG. 3C shows the safety position PS of the free end of the control rod 34 when the cylinder rod 33 performs an over-stroke or extends beyond the second end position P2 of the nominal operating range of the turbine engine 10.

During movement of the cylinder rod 33 from the first end position P1' towards the second end position P2' of the nominal operating range, the drive mechanism 40 is guided in translation in the guide rail 47 towards the end portion 47b.

The second connecting member 44 then performs a rotational movement about its second end 44a hinged relative to the upstream end 34b of the control rod 34. This is the over-stroke of the cylinder 32a which ensures movement into the safety position of the control rod 34.

During movement of the control rod 34 from the second end position P2 towards the safety position PS, the main vane 21 is progressively movable from the second angle towards a safe pitch angle comprised between the first and second end angles of the nominal operating range, for example comprised between 5° and 15°, for example equal to 8°. The safe pitch angle is related to the safety position PS' defined by the over-stroke of the cylinder rod 33. For example, subject to an extension of the end portion 47b of the guide rail 47 to enable an additional movement of the guide pin 44c and therefore an additional pivoting of the second connecting member 44, an additional over-stroke of the cylinder rod 33 would also enable an over-stroke of the control rod 34 in the opposite direction so as to move the safety position PS. This would bring the safe pitch angle to a value closer to the first end angle of the nominal operating range.

Thus, in the event of breakdown of an element of the control kinematics of the vanes, placing the cylinder rod 33 into a known safety position, and thus tilting the vanes according to a known safety angle, allows knowing, at any time, the position of the control rod 34 and therefore the inclination (the pitch angle) of the vanes 21, and that being so in a reliable manner without affecting the maintenance cost of the engine. Moreover, the safety position allows ensuring the operation of the turbine engine, even in the event of breakdown of an element of the control kinematics of the vanes.

Figure 4A:
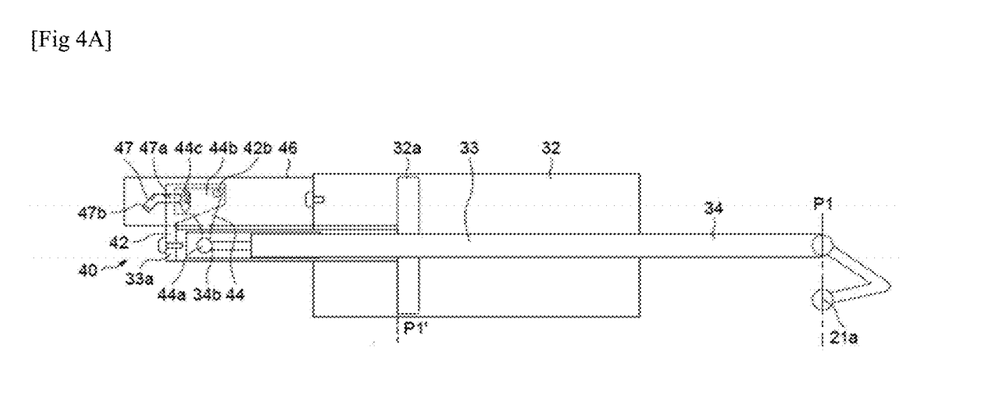
FIG. 4C show three positions of a control device according to another embodiment of the invention.
Figure 4B:
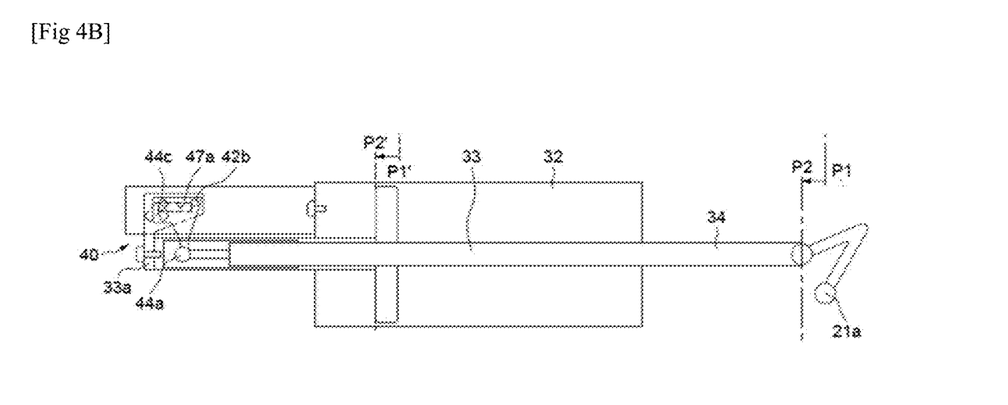
Figure 4C:
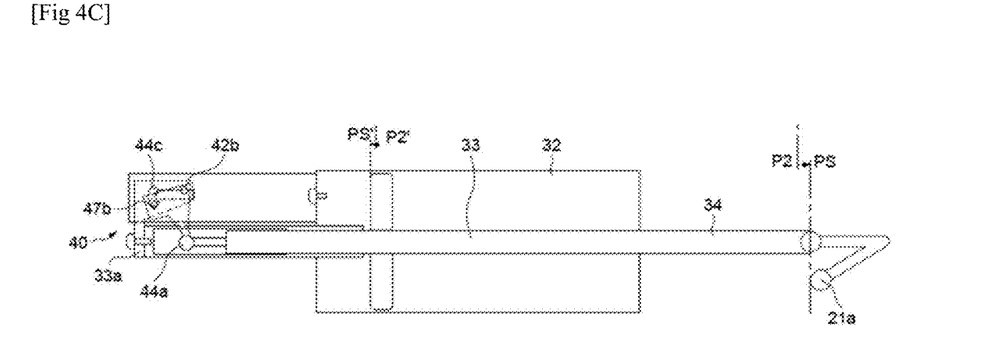

The embodiments illustrated in FIGS. 4A, 4B and 4C wherein the same elements bear the same references, differs from the embodiment illustrated in FIGS. 2, 3A, B, 3C only in that fastening of the first connecting member 42 to the cylinder tubular rod 33 is located upstream of the upstream end 34b of the control rod 34.

In other words, the second upstream end 34b of the control rod 34 hinged relative to the first end 44a of the second connecting member 44 is located downstream of the upstream end 33a of the cylinder tubular rod 33 secured to the first connecting member 42.

Figure 5:
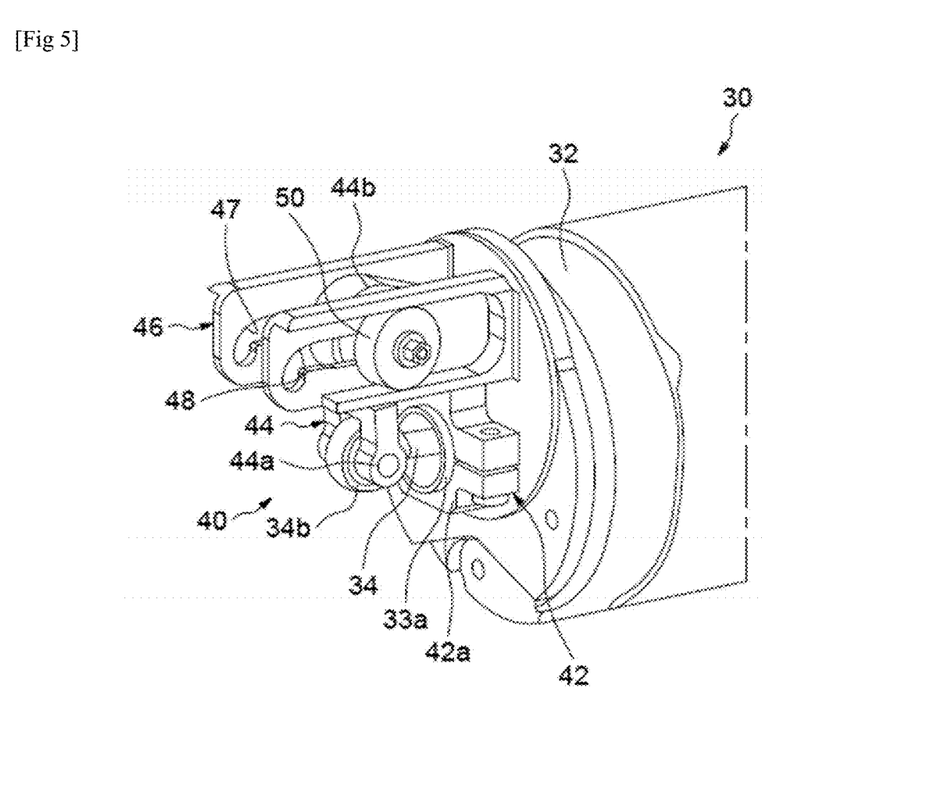
FIG. 5 shows the control device according to another embodiment of the invention.

In the embodiment illustrated in FIG. 5, wherein the same elements bear the same references, movement of the second connecting member 44 in the nominal operating range is ensured by bearings 50 guided by rails 47, 48 arranged on either side of a double slide.

The use of bearings allows improving reliability, and in particular limiting wear during movement of said second connecting member 44.

In general, the use of the control device 30 is not limited to a turbine engine and can be used to ensure the movement of the control rod and thus the orientation of fins mounted upstream of a steered wheel towards a safety position in the event of failure of an element of said control device. The safe pitch angle of the fins is within the pitch angle range useful for nominal operation of the steered wheel. This safe pitch angle is reached upon an over-stroke of an actuator or cylinder rod of the control device.

Thanks to the invention, it is possible to bring the control rod and thus the pitch angle of the vanes towards a reliable safety position, while facilitating maintenance in the event of failure of the drive mechanism. Indeed, the drive mechanism 40 is integrated directly between the connection of the control rod and of the rod of the cylinder, which allows improving accessibility thereof in case of maintenance.

The invention claimed is:

1. A device for controlling an airflow guiding system comprising:
    at least one vane movable in rotation about an axis of the vane between a first angle and a second angle,
    an actuator comprising a body inside which a piston is mounted movable in translation secured to an actuating rod,
    a control rod mounted in translation in the actuating rod and comprising a downstream end connected to the axis of the vane, the actuator being configured to drive the piston in movement between a first piston position and a second piston position of a nominal operating range and the downstream end of the control rod between a first rod position and a second rod position of a nominal operating range in which the vane is movable between the first angle and the second angle, the device being characterized in that it comprises a drive mechanism linking an upstream end of the actuation rod to an upstream end of the control rod, opposite to the downstream end of the control rod, in that in the event of breakdown of the control device, the actuator is configured to perform an over-stroke of the piston into a safety position located beyond said second piston position of the piston, during the over-stroke of the piston in the safety position, the drive mechanism is configured to bring the downstream end of the control rod into a safety position located between the first rod position and the second rod position of the nominal operating range and in which the vane is oriented at a safe pitch angle comprised between the first angle and the second angle.

2. The device according to claim 1, wherein the drive mechanism comprises a first connecting member comprising a first end and a second end, wherein the first end of the first connecting member is secured to the upstream end of the actuation rod and the second end of the first connecting member is connected to the control rod via a second connecting member.

3. The device according to claim 2, wherein the second connecting member comprises a first end and a second end, wherein the first end of the second connecting member is hinged relative to the upstream end of the control rod, and wherein the second end of the second connecting member is hinged relative to the second end of the first connecting member.

4. The device according to claim 2, wherein the drive mechanism further comprises a guide casing fastened on the body and comprising at least one guide rail cooperating with at least one guide pin carried by a second guide member.

5. The device according to claim 4, wherein the guide rail comprises a rectilinear main portion parallel to the axis of a turbine engine and a curve-shaped end portion, said guide pin being located in a stowed position inside said end portion in the safety position of the control rod.

6. The device according to claim 4, wherein the guide casing comprises two opposite guide rails each cooperating with a bearing carried by the second connecting member.

7. The device according to claim 2, wherein the second end of the control rod hinged relative to a first end of the second connecting member is located upstream of the upstream end of the actuation rod secured to the first connecting member.

8. The device according to claim 2, wherein the upstream end of the control rod hinged relative to a first end of the second connecting member is located downstream of the upstream end of the actuation rod secured to the first connecting member.

9. The device according to claim 1, wherein the actuation rod is tubular and is axially crossed by the control rod, the control rod configured to move inside the actuation rod.

10. An aircraft turbine engine comprising, from upstream to downstream in a flow direction of a flow of air, an inlet sleeve receiving the air, a centrifugal compressor, an annular combustion chamber located downstream of the compressor, a high-pressure power turbine configured to drive the centrifugal compressor in rotation, an output turbine configured to drive an output shaft in rotation, an airflow guiding system positioned upstream of the centrifugal compressor, and the device for controlling said airflow guiding system according to claim 1.

11. A single-engine helicopter comprising a turbine engine according to claim 10.

* * * * *